Oct. 6, 1931.  W. M. HEPBURN  1,826,213
CONTROLLING MEANS FOR HEAT EXCHANGE APPARATUS
Filed April 2, 1930  2 Sheets-Sheet 1
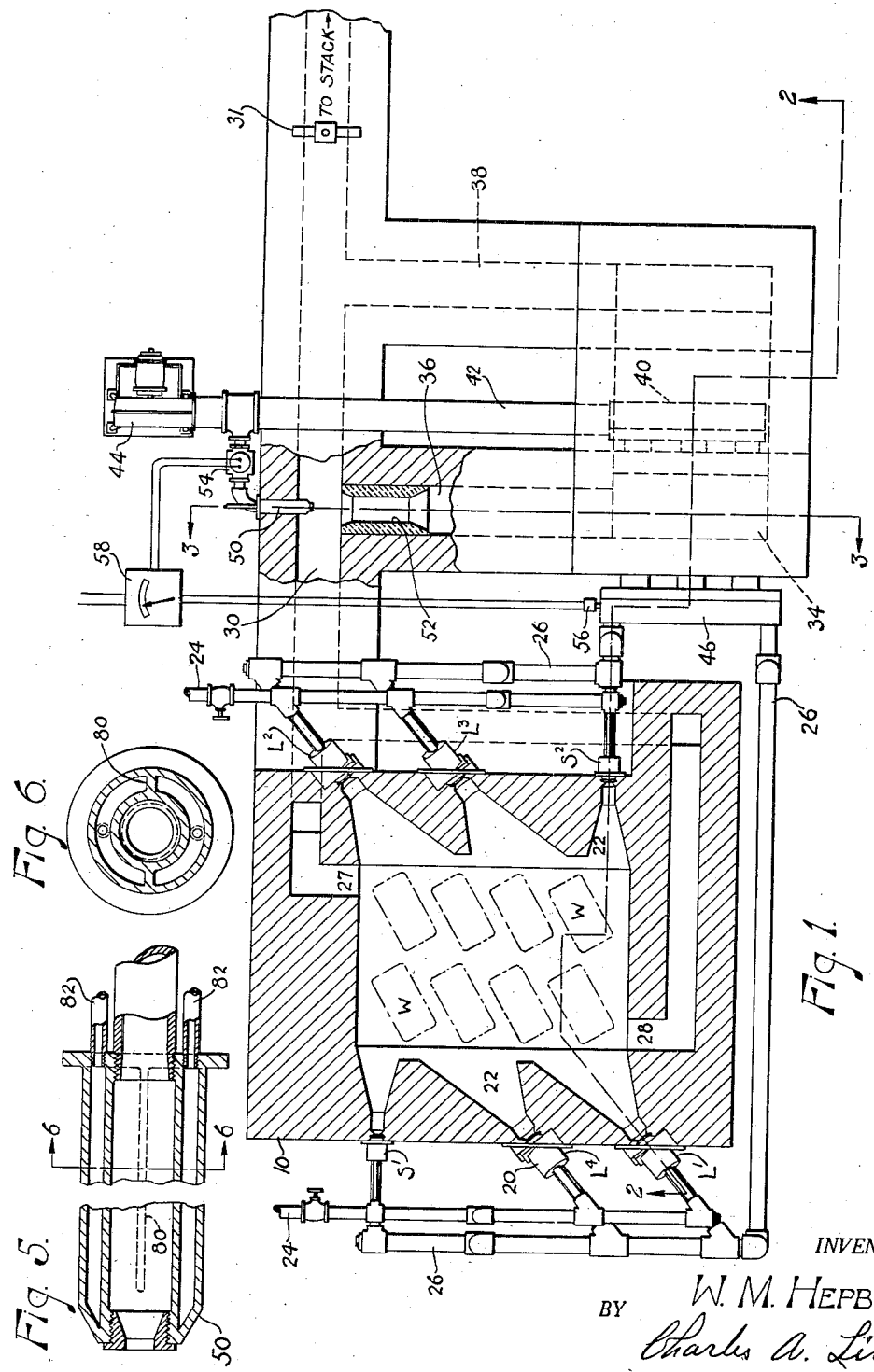
INVENTOR.
W. M. HEPBURN
BY Charles A. Lind
ATTORNEY.

Oct. 6, 1931. W. M. HEPBURN 1,826,213
CONTROLLING MEANS FOR HEAT EXCHANGE APPARATUS
Filed April 2, 1930 2 Sheets-Sheet 2
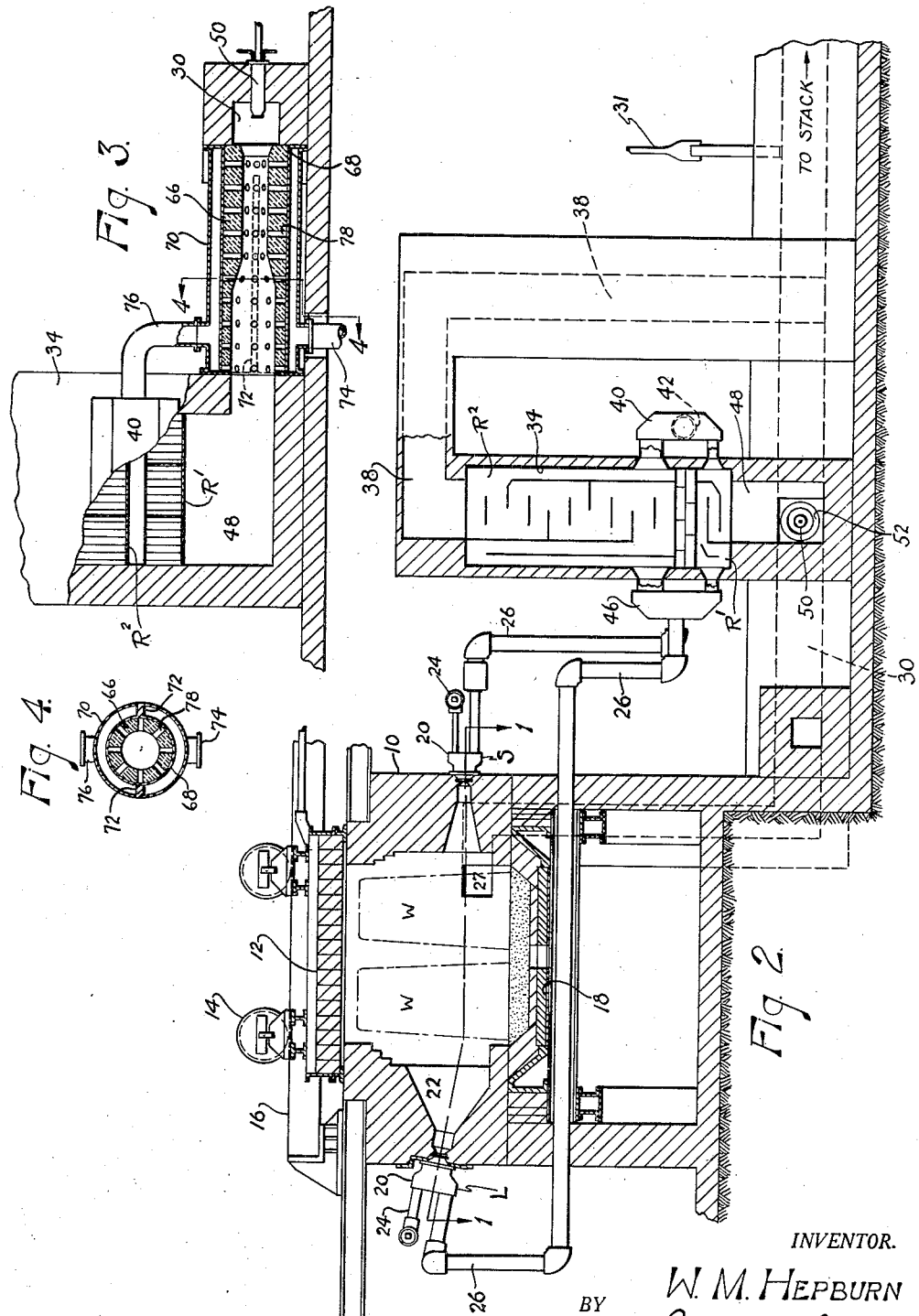
INVENTOR.
W. M. HEPBURN
BY Charles A. Lind
ATTORNEY.

Patented Oct. 6, 1931

1,826,213

UNITED STATES PATENT OFFICE

WILLIAM M. HEPBURN, OF TOLEDO, OHIO, ASSIGNOR TO SURFACE COMBUSTION CORPORATION, OF TOLEDO, OHIO, A CORPORATION OF NEW YORK

CONTROLLING MEANS FOR HEAT EXCHANGE APPARATUS

Application filed April 2, 1930. Serial No. 441,087.

This invention relates to controlling means for heat exchange apparatus and more particularly to improvements in furnace installations containing heat exchange apparatus for preheating air for combustion.

In the usual furnace installation containing heat exchange apparatus through which flue gases are passed for preheating air for combustion, the main consideration is to impart as much heat as possible to the air, the idea being that the hotter the air the more efficient the combustion, and to this end the flue gases are passed through the heat exchanger at as high a temperature as the apparatus will stand.

Now, since the degree of preheat of the air is a factor in combustion control and of the temperature attained in the furnace it follows that a constant-temperature supply of preheated air is conducive to better heat control in the furnace by eliminating the variable of air preheat.

It is, therefore, an object of this invention to provide ways and means for maintaining a constant-temperature supply of preheated air. Another object is to provide improved ways and means for tempering the flue gases before they reach the heat exchanger in order to prevent destruction thereof by high temperature flue gases. The above and other objects will more fully appear from the detailed description taken in connection with the accompanying drawings forming part of this specification.

Referring to the drawings:

Fig. 1 is a plan sectional view showing the invention in combination with a furnace known in the art as a soaking pit, the section through the soaking pit being taken on line 1—1 of Fig. 2.

Fig. 2 is a vertical sectional view on line 2—2 of Fig. 1.

Fig. 3 is a vertical sectional view corresponding to line 3—3 of Fig. 1 and showing a modified form of flow passage between the recuperator and main flue gas conduit.

Fig. 4 is a vertical section on line 4—4 of Fig. 3.

Fig. 5 is a longitudinal section on an enlarged scale through the injector nozzle for diverting flue gases from the main flue gas conduit to the recuperator.

Fig. 6 is a cross section on line 6—6 of Fig. 5.

The invention has been shown in connection with a soaking pit which is a high temperature furnace used in steel mills for heating ingots prior to rolling but the particular type of furnace in conjunction with which the invention is used is immaterial, the main point being that the invention has special utility where the flue gases from the furnace are of such high temperature as to be destructive to heat-exchangers made of heat-resisting alloy.

Aside from the firing system the soaking pit herein shown is of more or less conventional construction and briefly described comprises a refractory structure 10 forming a pit or heating chamber wherein ingots W are placed for heating prior to rolling, the pit having a laterally movable roof or cover 12 supported on wheels 14 adapted to ride on tracks 16 in the conventional manner. The floor or bottom 18 of the pit is of the usual or suitable construction and has a cinder bed on which the ingots rest.

The soaking pit herein shown departs from the conventional type of soaking pit in that gaseous fuel is introduced into the pit in a manner to induce or set up a pronounced rotary motion of the heating gases in the pit and withal an active swirling of the heating gases whereby stratification of the heating gases is prevented.

The fuel injecting means may be of any suitable type but are prefereably of the type shown, that is to say, a type wherein the air and fuel gas are mixed immediately before being introduced into the pit. The mixing heads or burners are indicated at 20 and generally speaking, each burner comprises a closed casing having a nozzle outlet set to discharge into an expanding combustion chamber 22 formed in the walls of the pit, the gas and air being delivered to said casing by supply pipes 24 and 26 respectively, the air being delivered at a relatively higher pressure than the gas, the usual air pressure being about one pound per square inch.

The burners are so disposed with respect to each other and with respect to the walls of the pit that a rotary motion of the heating gases about a vertical axis in the pit is set up. Any suitable number of burners consistent with proper heating of the ingots may be used. In the present instance six burners are shown, four large burners generally indicated by the base letter L and two smaller burners indicated by the base letter S. Burners $L^1$ and $L^2$ are at diagonally opposite corners of the pit and preferably have their axes in vertical parallel planes or in the same vertical plane and preferably fire at a compound angle to the walls of the pit, that is to say, they fire at an angle to the opposite side walls of the pit and also at an angle to the floor of the pit. By causing the burners to fire in a downwardly inclined direction, that is, towards the lower and thicker portions of the ingots (the usual ingot being tapered), it follows that the heat is initially directed where most needed.

In order to set up a pronounced rotary motion of the heating gases in the pit, the burners $S^1$ and $S^2$ are provided, these burners being set to fire parallel to the end walls of the pit and directly towards the opposite side walls, this motion being clockwise when the burner arrangement is as shown in Fig. 1. The other burners $L^3$ and $L^4$ preferably have their axes parallel to the axes of the respective adjacent burners $L^2$ and $L^1$. It will be appreciated that burners $L^3$ and $L^4$ will, even in the absence of burners $S^1$ and $S^2$, tend to set up a rotary motion of the heating gases in the pit. However, burners $S^1$ and $S^2$ are useful both from the standpoint of supplying heat to the ends of the pit and in assisting in the setting up a rotary motion of the heating gases as said and consequently they will ordinarily be employed. The combustible mixture being supplied under pressure, it follows that a pressure in excess of the atmosphere can be maintained in the pit and hence the entry of free air excluded from the pit and scaling of the ingots reduced to a minimum.

The spent heating gases leave the pit through appropriate passages 27 and 28 preferably arranged at diagonally opposite corners of the pit opposite the burners S. These passages lead to a common flue passage or conduit 30 which leads to a stack, a damper 31 being preferably provided for regulating the draft as will be readily understood.

The novel firing system herein disclosed is described and claimed in my copending application Serial No. 437,398 filed March 20, 1930.

Now, according to the present invention, the heat exchange apparatus, generally indicated at 34 and which is preferably a recuperator made of heat-resisting alloy is located at one side of the flue gas conduit 30 on a by-pass, a passage 36 leading from the conduit 30 to the recuperator and a passage 38 leading from the recuperator back to said conduit. The heat exchanger as regards the arrangement of flow passages for the flue gas and air, respectively, may be of any suitable or preferred design and while for most efficient operation should be made of metal, that is to say, heat-resisting alloy, yet as will more clearly hereinafter appear, certain features of the invention are applicable to heat exchangers generally whether constructed of tile or of metal. The specific construction of the heat exchanger herein shown forms no part of the present invention and is to be taken as merely illustrative of any suitable type.

The air to be preheated enters the heat exchanger from manifold 40, the air being delivered thereto by supply pipe 42 which leads from a fan or blower 44 (see Fig. 1) adapted to deliver the air at a pressure, say of one pound per square inch. The heated air from the heat exchanger enters a manifold 46 and flows therefrom by way of the pipes 26 to the burners or mixing heads 20 previously described where it mixes with the fuel gas delivered to the heads by supply pipes 24.

The flue gas enters the heat exchanger from below a chamber 48 being delivered thereto in a manner presently described, and leaves the heat exchanger at the top from whence it flows by way of passage 38 to the conduit 30 leading to the stack not shown.

The heat exchanger shown is a so-called recuperator and has independent, lower and upper sections $R^1$ and $R^2$, in order that the lower section may be replaced without disturbing the upper section, the lower section usually having a shorter life than the upper section. The flow path of the air through the recuperator will be readily understood by reference to Fig. 1 and need not be described in detail, the flue gas passing upwardly between suitable partition walls as will be readily understood by those skilled in the art.

Flue gas from the waste conduit 30 is diverted to the heat exchanger by an air injector nozzle 50, this nozzle being set to discharge into a throat 52 positioned at the inlet end of passage 36. Air under pressure is supplied to the injector nozzle by the blower 44 through appropriate connections which include a motor-operated valve 54. It will be readily appreciated that by discharging a core of air across the normal flow path of the flue gas and into said throat, a certain volume of the flue gas will be induced to enter the throat 52 and from thence flow to the heat exchanger.

It will, of course, be appreciated that the air discharged from the nozzle 50 will mix with and temper the flue gas diverted to the heat exchanger and hence that by making the nozzle of suitable capacity, the temperature of the flue gas entering the heat exchanger may be readily controlled. It will, of course, be understood that the proportionate amount of flue gas diverted to the heat exchanger by the injector nozzle 50 will depend among other things on the distance between the adjacent ends of the nozzle and throat 52 and other factors well understood by those familiar with injector principles.

As previously stated, control of the degree of preheat of the air is an important factor in combustion control. Now in accordance with the present invention, the temperature control of the air is accomplished in the following manner. Positioned at some suitable point in the air delivery line between the heat exchanger and the burners 20, for example, at the manifold 46, is a pyrometer 56 in circuit with apparatus 58 adapted to actuate the motor valve 54 in the air nozzle supply line. If the temperature of the air increases beyond a predetermined point, say 800° F. the motor valve will be actuated to close off the flow of air to the nozzle 50 whereas if said temperature decreases the valve will be opened.

It will now be seen that the present invention not only provides for tempering the flue gases diverted to the heat exchanger but also provides for maintaining a constant temperature of the air from the heat exchanger.

In Fig. 3 I have shown a modified form of throat air flow passage between the heat exchanger and the main flue gas conduit 30, the main feature being the provision of means for air cooling the throat and flow passage. Extending between said conduit 30 and the heat exchanger is a refractory conduit 66 contained within a tubular casing 68 which in turn is surrounded by a tubular casing 70, there being formed between the two casings an annular chamber divided by longitudinally extending partitions 72 into upper and lower sections which are in communication adjacent the entrance and hottest end of said refractory conduit 66. Air is entered into the lower section by a pipe 74, and flows forwardly and then into the upper section from which it leaves by pipe 76 which delivers to the heat exchanger as at the inlet manifold 40 (see Fig. 2).

It will be noted that the refractory throat is radially perforated along its length as indicated at 78. These perforations permit heat to be transmitted to the surrounding casing 68 and assist in keeping the refractory cool. A refractory passage as in Fig. 3 has special utility where the flue gas is of extremely high temperature or where it may contain combustibles which on mixing with air from the injector nozzle 50 will burn. In such case air cooling of the passage may be necessary as will be readily appreciated in order to properly temper the gases before they reach the heat exchanger.

Since the injector nozzle 50 extends into the conduit 30 and is therefore exposed to the high temperature flue gases, it will usually be found necessary or desirable to provide suitable cooling means therefor. As shown in Figs. 5 and 6 this cooling means may consist of a water jacket wherein is a partition 80 for causing the water to flow first forward toward the nozzle tip and back, the water pipes being indicated at 82.

What is claimed is:

1. In combination, a heat exchange apparatus through which air and flue gases may be passed in separate streams for heat exchange, means independent of said apparatus forming a flow path for high temperature flue gas, means for by-passing regulatable amounts of said gas through said apparatus, and means for tempering the gas so by-passed.

2. In combination, a heat exchange apparatus through which air and flue gases may be passed in separate streams for heat exchange, means independent of said apparatus forming a flow path for high temperature flue gas, means for by-passing regulatable amounts of said gas through said apparatus, means for tempering the gas so by-passed, and means controlled by the temperature of the air from said apparatus for controlling the amount of the gas by-passed as said.

3. In combination, a heat exchange apparatus through which air and flue gases may be passed in separate streams for heat exchange, means independent of said apparatus forming a flow path for high temperature flue gas, and means set to discharge a relatively cool fluid medium across said flow path in a manner to induce a flow of a portion of said gas toward said apparatus for passage therethrough.

4. In combination, a heat exchange apparatus through which air and flue gases may be passed in separate streams for heat exchange, means independent of said apparatus forming a flow path for high temperature flue gas, means set to discharge a relatively cool fluid medium across said flow path in a manner to induce a flow of a portion of said gas toward said apparatus for passage therethrough, and means controlled by the temperature of the air from said apparatus for controlling the supply of said fluid medium.

5. In combination a metal heat exchange apparatus subject to injury by flue gases having a temperature above a given degree, means independent of said apparatus forming a flow path for flue gases having a temperature in excess of said degree, means for diverting a portion of said gases through said apparatus, and means for tempering the gases so diverted to a temperature below said degree before they reach said apparatus.

6. In combination a metal heat exchange apparatus subject to injury by flue gases having a temperature above a given degree, means independent of said apparatus forming a flow path for flue gases having a temperature in excess of said degree, means for diverting a portion of said gases through said apparatus, means for tempering the gases so diverted to a temperature below said degree before they reach said apparatus, and means responsive to a temperature condition for controlling the amount of gases diverted as said.

7. In combination, a metal heat-exchange apparatus subject to injury by flue gases having a temperature above a given degree, means independent of said apparatus forming a flow path for flue gases having a temperature in excess of said degree, and means set to discharge a stream of fluid medium across said flow path in a manner to induce a flow of gas to said apparatus.

8. Apparatus for preheating air for combustion comprising in combination, means forming a flow path for hot flue gases, a recuperator alongside said path, means forming a passage through which flue gas may flow from said path to said recuperator, means for diverting a portion of said gases into said path, and means for tempering the gases so diverted before they reach the recuperator.

9. Apparatus for preheating air for combustion comprising in combination, means forming a flow path for hot flue gases, a recuperator alongside said path, means forming a passage through which flue gas may flow from said path to said recuperator, means for diverting a portion of said gases into said path, and means responsive to a temperature condition of the air passing through said recuperator for controlling the amount of gases diverted to the recuperator.

In testimony whereof I affix my signature.

WILLIAM M. HEPBURN.